(12) United States Patent
Hummel

(10) Patent No.: US 10,532,603 B2
(45) Date of Patent: Jan. 14, 2020

(54) ADJUSTABLE CARPENTERS SQUARE AND METHOD OF USE

(71) Applicant: Woodpeckers, LLC, Strongsville, OH (US)

(72) Inventor: Richard M. Hummel, Parma, OH (US)

(73) Assignee: Woodpeckers, LLC, Strongsville, OH (US)

( * ) Notice: Subject to any disclaimer, the term of this patent is extended or adjusted under 35 U.S.C. 154(b) by 216 days.

(21) Appl. No.: 15/877,882

(22) Filed: Jan. 23, 2018

(65) Prior Publication Data

US 2019/0225009 A1 Jul. 25, 2019

(51) Int. Cl.
*B43L 7/02* (2006.01)
*B43L 7/10* (2006.01)
*G01B 3/56* (2006.01)

(52) U.S. Cl.
CPC .............. *B43L 7/02* (2013.01); *B43L 7/10* (2013.01); *G01B 3/566* (2013.01)

(58) Field of Classification Search
CPC ............ B43L 7/02; B43L 7/027; G01B 3/566
USPC ........................................................ 33/475
See application file for complete search history.

(56) References Cited

U.S. PATENT DOCUMENTS

| | | | | |
|---|---|---|---|---|
| 296,157 A | * | 4/1884 | Gabriel ................. | G01B 3/566 33/475 |
| 392,426 A | * | 11/1888 | Hayden ................. | G01B 3/566 33/475 |
| 563,465 A | | 7/1896 | Farley | |
| 707,301 A | * | 8/1902 | Chesterman .......... | G01B 3/566 33/475 |
| 1,232,613 A | * | 7/1917 | Scheeder .............. | G01B 3/566 33/475 |
| 2,470,035 A | * | 5/1949 | Hudkins ................ | B43L 7/027 33/418 |
| 2,474,577 A | * | 6/1949 | Gancer ................. | G01B 3/566 33/475 |
| 2,608,765 A | * | 9/1952 | Doud .................... | G01B 3/566 33/475 |
| 2,745,183 A | * | 5/1956 | Pe Queen ............. | G01B 3/566 33/418 |
| 3,067,518 A | * | 12/1962 | Herman ................ | G01B 3/566 33/475 |
| 4,562,649 A | | 1/1986 | Ciavarella | |
| 4,729,173 A | | 3/1988 | Wilson | |
| 5,058,284 A | * | 10/1991 | Stevenson ............ | G01B 5/245 33/471 |

(Continued)

*Primary Examiner* — Christopher W Fulton
(74) *Attorney, Agent, or Firm* — Sand, Sebolt & Wernow Co., LPA

(57) ABSTRACT

An adjustable carpenters square has a handle and first and second blades extending from the handle in a substantially perpendicular relationship. The first blade is fixed in the handle and the second blade is pivotally mounted on the handle to enable it to be adjustable with respect to the fixed first blade to ensure that it is at a true 90° to the first blade. A cam mechanism is mounted in the handle and engageable with the second blade to pivot the second blade with respect to the first blade. The cam mechanism includes a one-piece cam having a cylindrical base and a cam portion offset therefrom. This cam mechanism enables the method of the present invention of adjusting the perpendicular relationship between the two blades to be achieved with a high degree of accuracy.

19 Claims, 13 Drawing Sheets

(56) References Cited

U.S. PATENT DOCUMENTS

| | | | |
|---|---|---|---|
| D353,111 S | 12/1994 | Meador | |
| 5,845,410 A * | 12/1998 | Boker | B27B 25/10 |
| | | | 33/536 |
| 7,047,655 B2 | 5/2006 | Larsson | |
| 7,526,871 B1 * | 5/2009 | Chase | B43L 7/10 |
| | | | 33/471 |
| 8,191,275 B2 | 6/2012 | Whitcomb | |
| 2009/0193670 A1 * | 8/2009 | Fernandes | B25H 7/00 |
| | | | 33/27.03 |

* cited by examiner

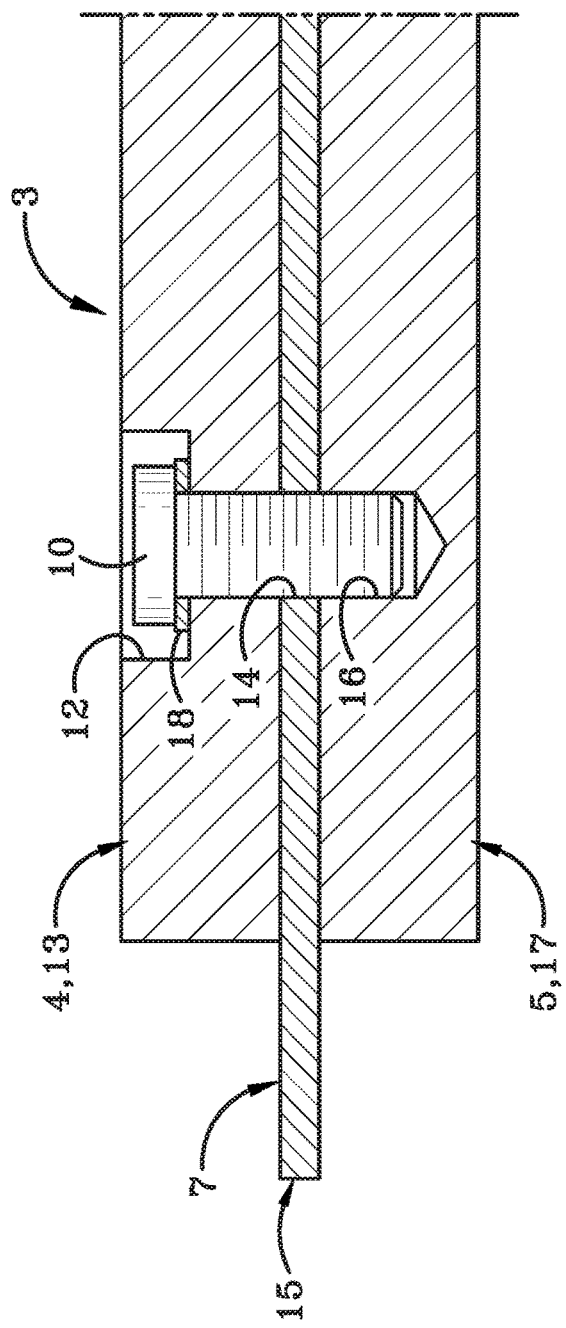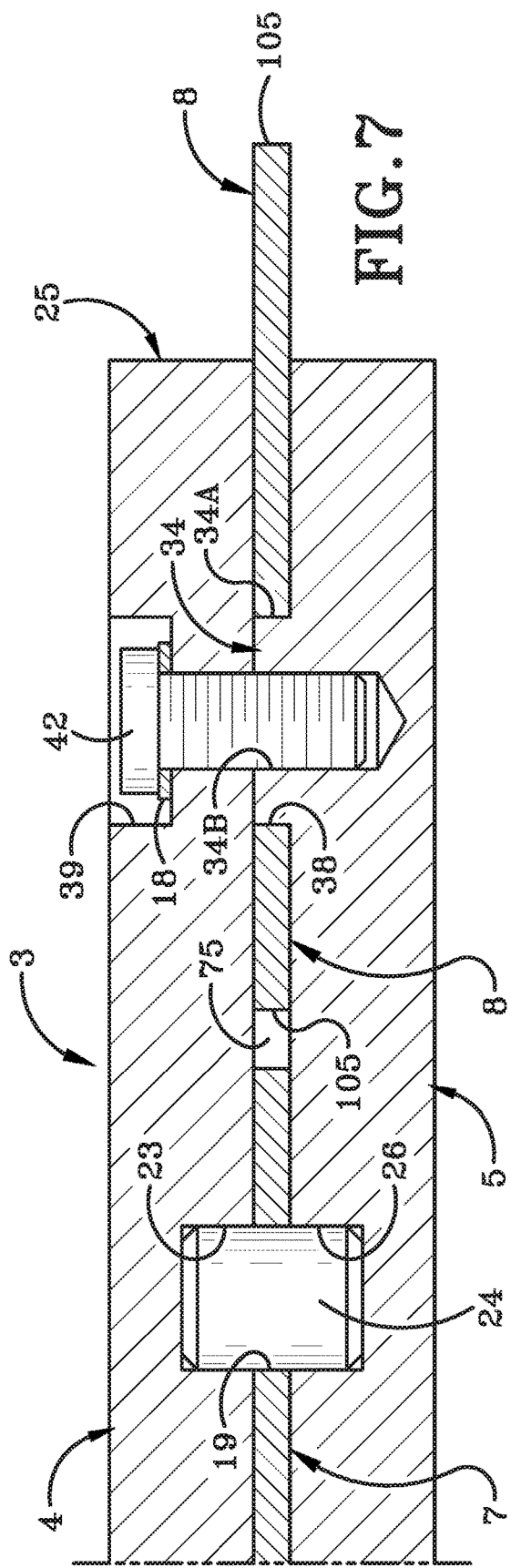

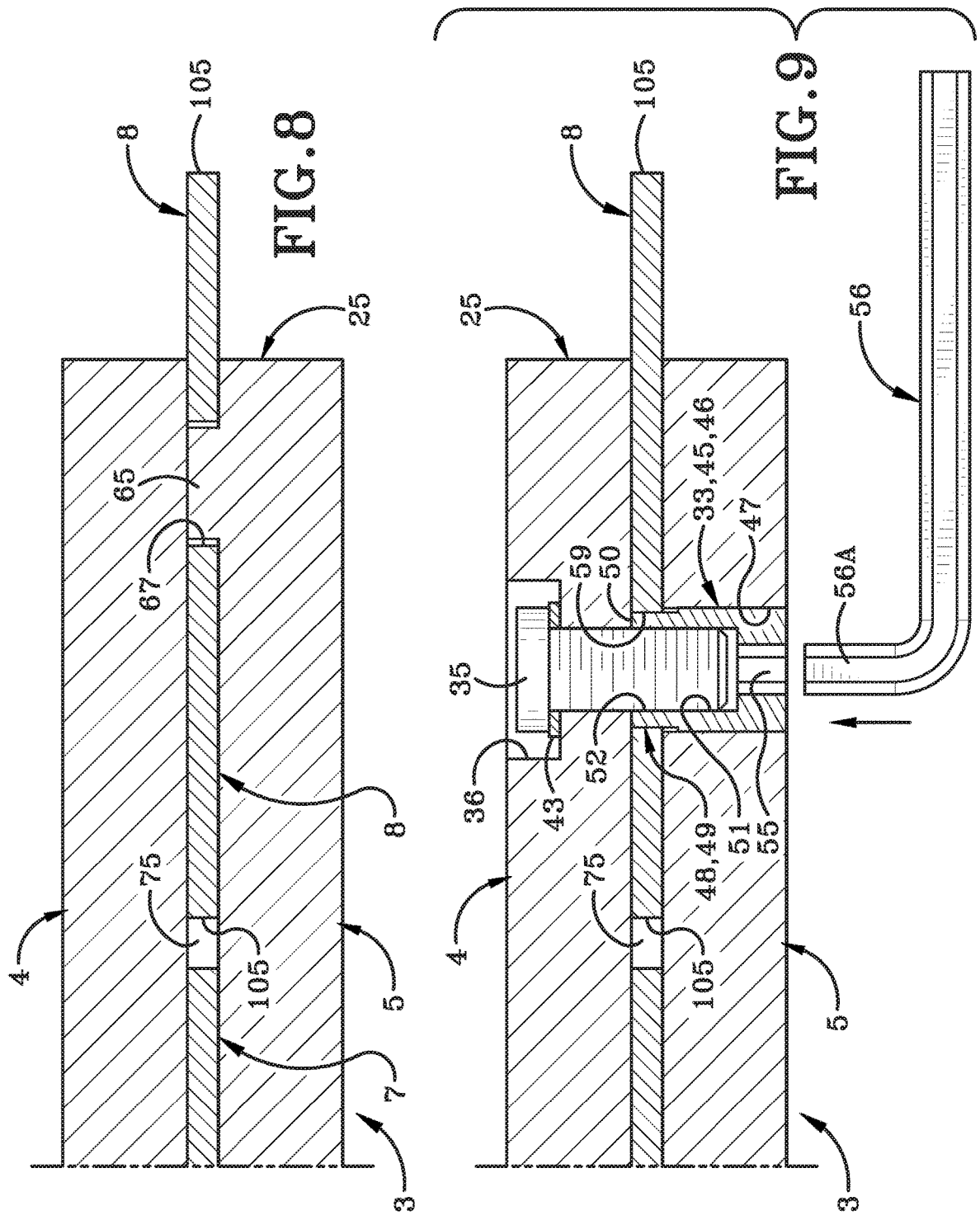

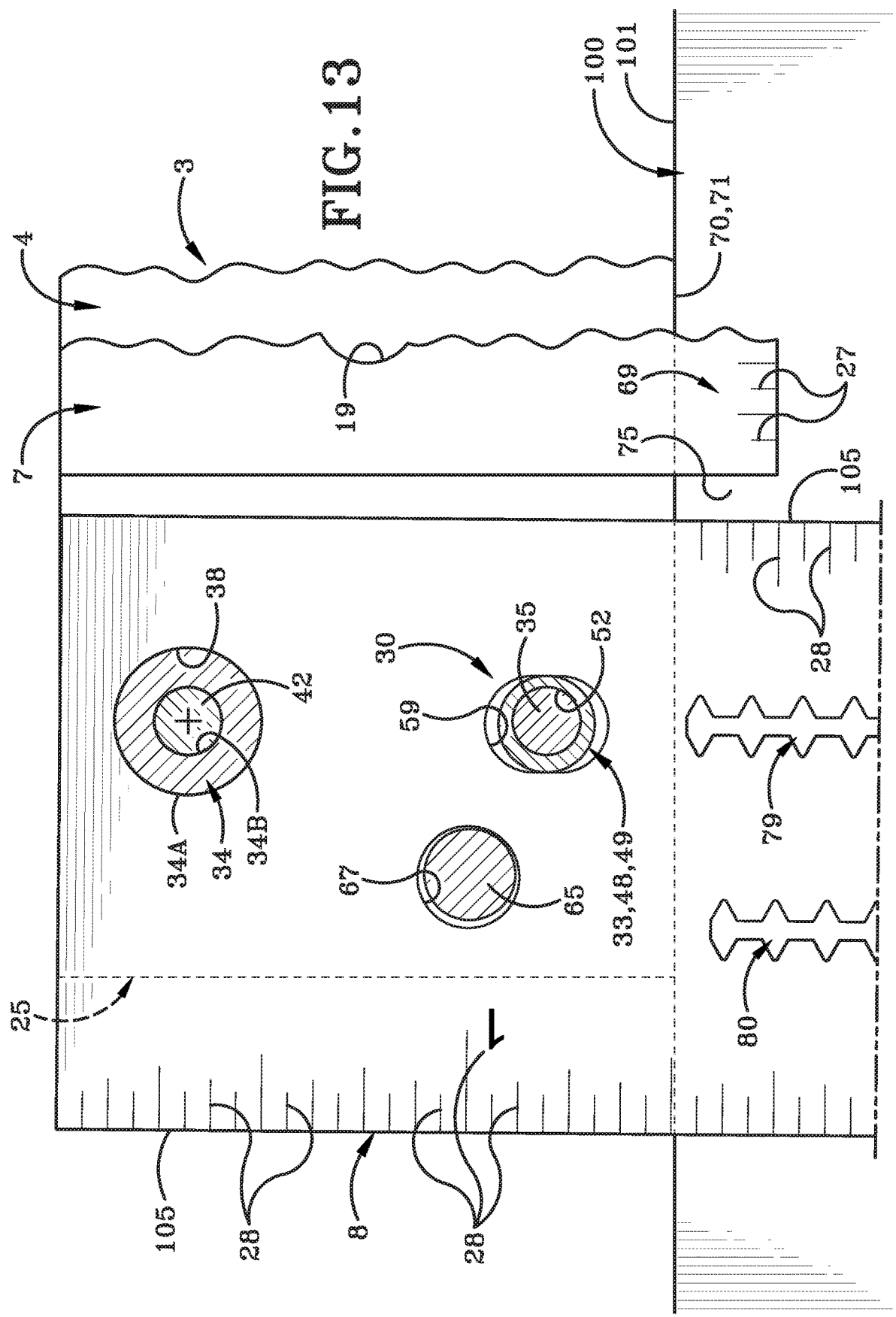

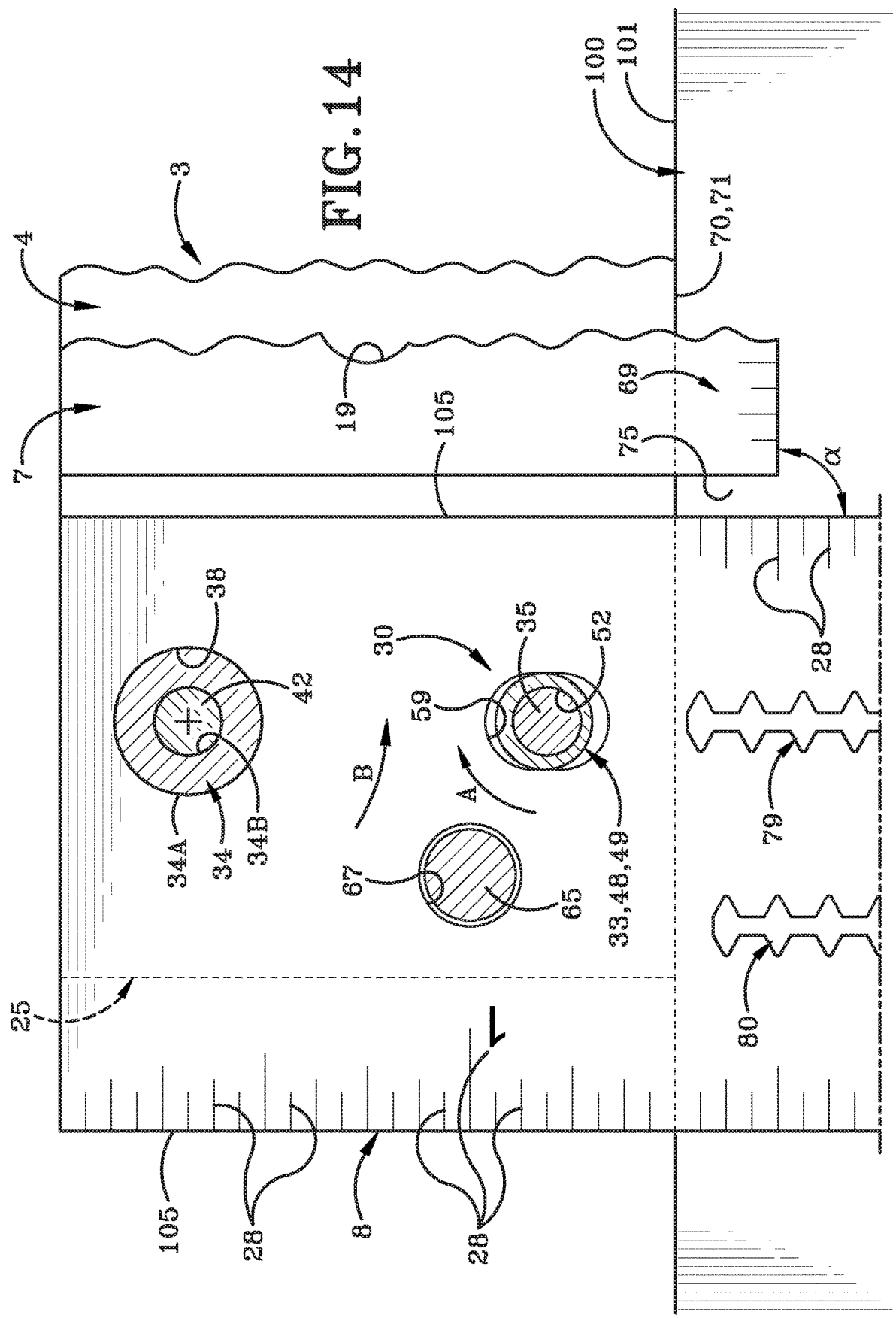

ADJUSTABLE CARPENTERS SQUARE AND METHOD OF USE

BACKGROUND

Technical Field

The present disclosure relates to a carpenter's tool, and more particularly, to an adjustable carpenters square. Even more particularly, the invention relates to an adjustment mechanism utilizing a cam for accurately ensuring that the angle between the two blades of the carpenters squares is at a precise 90° for use in work requiring extreme accuracy.

Background Information

In the construction and tool and die industry, a carpenters square is used to ensure that various parts of a structure are accurate having 90° angles where required. A carpenters square is used in laying out the pieces or construction materials. These carpenters squares come in various sizes and configurations, all of which includes a pair of blades usually having distance indicia printed, embossed or etched therein, which blades are at 90° with respect to each other. Many of these carpenters squares are one-piece members formed of wood, plastic, or metal, which when manufactured ensure that the angle between the two blades is at 90°. However, over time and use, this angle may change ever so slightly due to the rough handling, storage, and use of the carpenter's square. With these one-piece carpenters squares, there are no means to ensure that the angle between the two blades is exactly 90°.

Other carpenters squares have been developed that are adjustable, examples of which are shown in U.S. Pat. Nos. 4,562,649, 7,047,655, 4,729,173, and 8,191,275.

Although these prior art adjustable carpenters squares and one-piece carpenters squares are satisfactory for most measurements and layout work, it is desired for certain applications to have a device which is extremely accurate and adjustable to ensure that the angular relationship between the two blades is exactly 90°, and in which the device can be periodically checked to ensure that the required 90° relationship between the blades is still accurate or can be easily adjusted to ensure that they are in this desired 90° relationship.

SUMMARY

In one aspect, the present disclosure may provide an adjustable carpenters square comprising: a handle having inner and outer ends; a first blade having inner and outer ends mounted on and extending longitudinally along the handle; a second blade having inner and outer ends mounted on the inner end of the handle and extending from the handle in a substantially perpendicular relationship with respect to the first blade; and an adjustment mechanism operationally engaged with the inner end of the second blade for adjusting the perpendicular relationship between the first and second blades, said adjustment mechanism including a pivot member and a cam mounted in a spaced relationship from the pivot member at the inner end of the handle.

In another aspect, the present disclosure may provide a method of adjusting a carpenters square comprising the steps of: providing a carpenters square having a handle, a first blade secured to the handle and a second blade pivotally mounted on the handle and extending from the handle substantially perpendicularly to the first blade; placing the handle and first blade along a straight edge of a reference board with the second blade extending substantially perpendicularly from said handle along the board; drawing a first line on the board along a first edge of the second blade; flipping the carpenters square and placing the handle along the said edge of the reference board; locating the first edge of the second blade adjacent the first line on the reference board; drawing a second line on the board along the first edge of the second blade; pivotally moving the second blade to an adjusted position wherein the first edge of the second blade divides any space between the first and second lines drawn on the reference board; and then securing the second blade in the adjusted position wherein the second blade will be perpendicular to the first blade.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods and embodiments of the disclosure. It will be appreciated that the illustrated element in the figures represent one example of the element. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 6 is an enlarged fragmentary sectional view taken on line 6-6, FIG. 3;

FIG. 7 is an enlarged fragmentary sectional view taken on line 7-7, FIG. 3;

FIG. 8 is an enlarged fragmentary sectional view taken on line 8-8, FIG. 3;

FIG. 9 is an enlarged fragmentary sectional view taken on line 9-9, FIG. 3;

FIG. 13 is an enlarged fragmentary bottom plan view opposite than that of FIG. 5 with the top block removed showing the adjustment mechanism for carrying out the adjustment steps of FIGS. 10-12; and FIG. 14 is a view the same as FIG. 13 showing the adjustment mechanism pivotally moving one of the blades with respect to the other blade.

Similar numbers refer to similar parts throughout the drawings.

DETAILED DESCRIPTION

Figure 1:
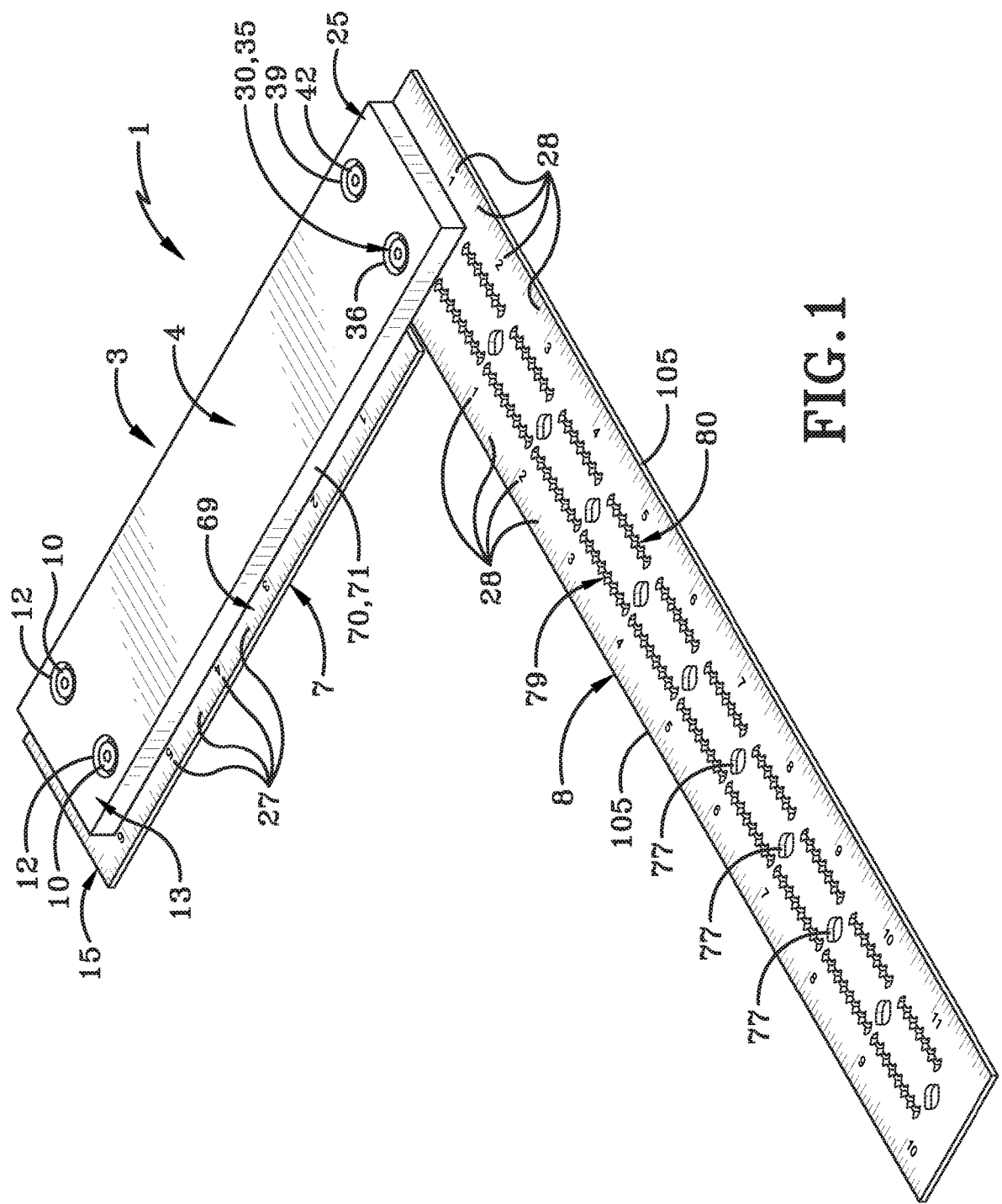
FIG. 1 is a perspective view of the carpenters square in assembled position.
Figure 2:
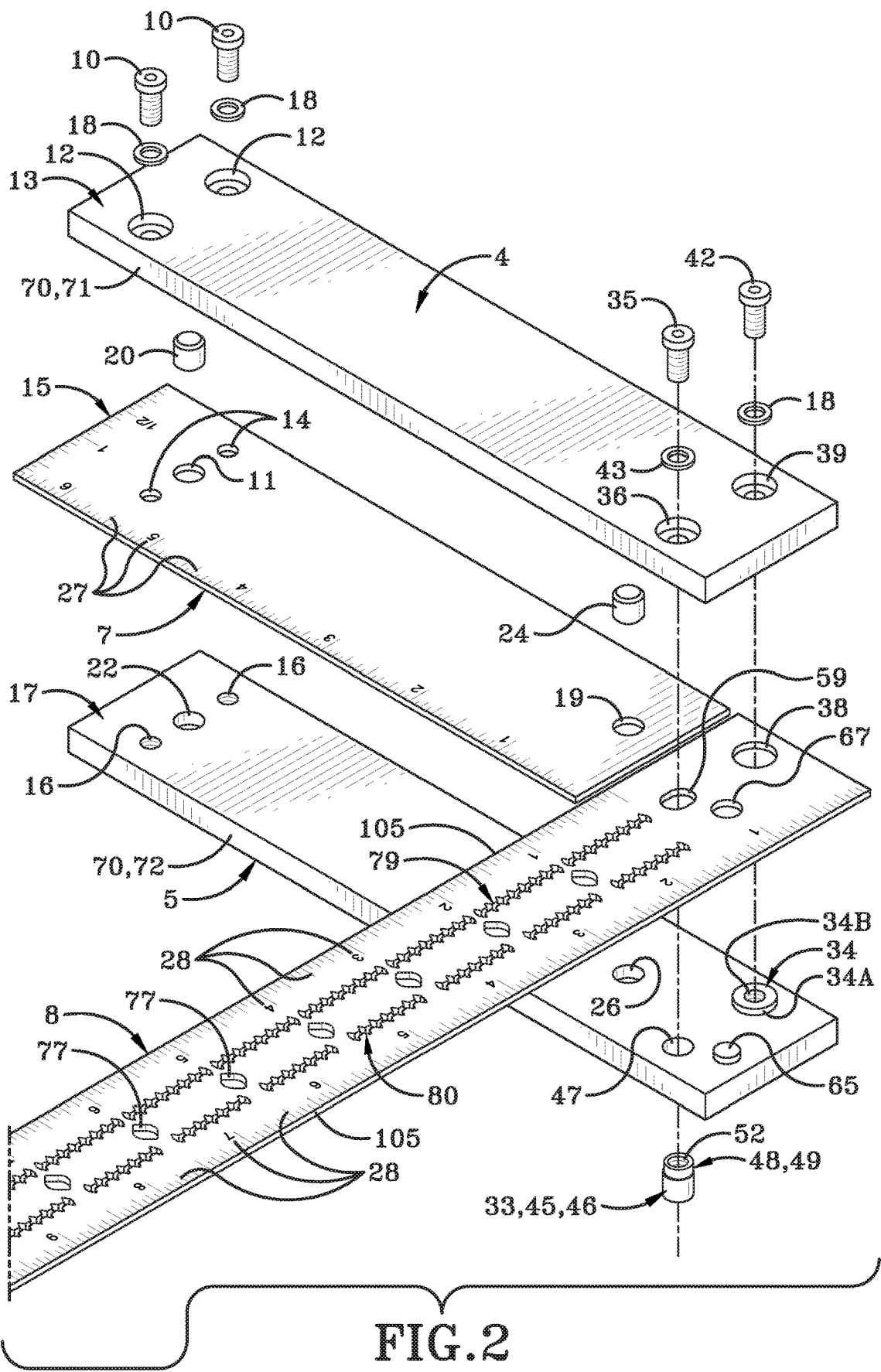
FIG. 2 is an exploded perspective view of the carpenters square of FIG. 1.

The adjustable carpenters square of the present invention is indicated generally at 1, and is shown in assembled position in FIG. 1 and an exploded condition in FIG. 2. Carpenters square 1 includes a handle indicated generally at 3, which includes elongated first and second blocks 4 and 5, a first blade 7 and a longer second blade 8. Blocks 4 and 5 are generally similar to each other and preferably are formed of a high strength metal such as aluminum or steel, and secure first blade 7 sandwiched therebetween by a pair of fasteners 10. Blades 7 and 8 preferably are elongated rectangular-shaped metal plates of equal thickness with blade 8 being longer than blade 7.

Fasteners 10 extend through a pair of counterbore holes or openings 12 formed in an outer end 13 of handle block 4 and through aligned holes or openings 14 formed adjacent outer end 15 of blade 7 and into threaded holes 16 formed in and adjacent to outer end 17 of handle block 5. Each fastener 10 may include a washer 18 seated in counterbore holes 12. Prior to securing blade 7 in a sandwiched relationship between blocks 4 and 5, a positioning dowel 20 will be seated in a pair of aligned holes 21 and 22 formed in handle blocks 4 and 5 respectively, and extend through a hole 11 formed in blade 7. A similar dowel 24 (FIGS. 2, 3, and 7) will be seated in aligned holes 23 and 26 formed in handle blocks 4 and 5, respectively, and extend through an aligned hole 19 formed in blade 7. These longitudinally spaced dowels ensure alignment of blade 7 in a sandwiched relationship between blocks 4 and 5 at the inner end 25 of handle 3.

In accordance with one of the main features of the invention, an adjustment mechanism indicated generally at 30, is located at the inner end 25 of handle 3. One of the main elements of adjustment mechanism 30 for ensuring the perpendicular relationship between blades 7 and 8, is a cam 33. Cam 33 is shown particularly in FIGS. 2A and 2B, and preferably is a one-piece member formed of bronze or other high strength, high quality metal. Cam 33 includes a cylindrical base portion 45 having an outer cylindrical surface 46 defined by a first radius $R_1$ and a camming portion 48 which is offset from cylindrical base portion 45. Camming portion 48 of cam 33 has an outer cylindrical surface 49 defined by a second radius $R_2$, which is smaller than radius $R_1$. Outer surface 49 provides the camming surface engageable with second blade 8 providing for the adjustment thereof as discussed further below.

Figure 2A:
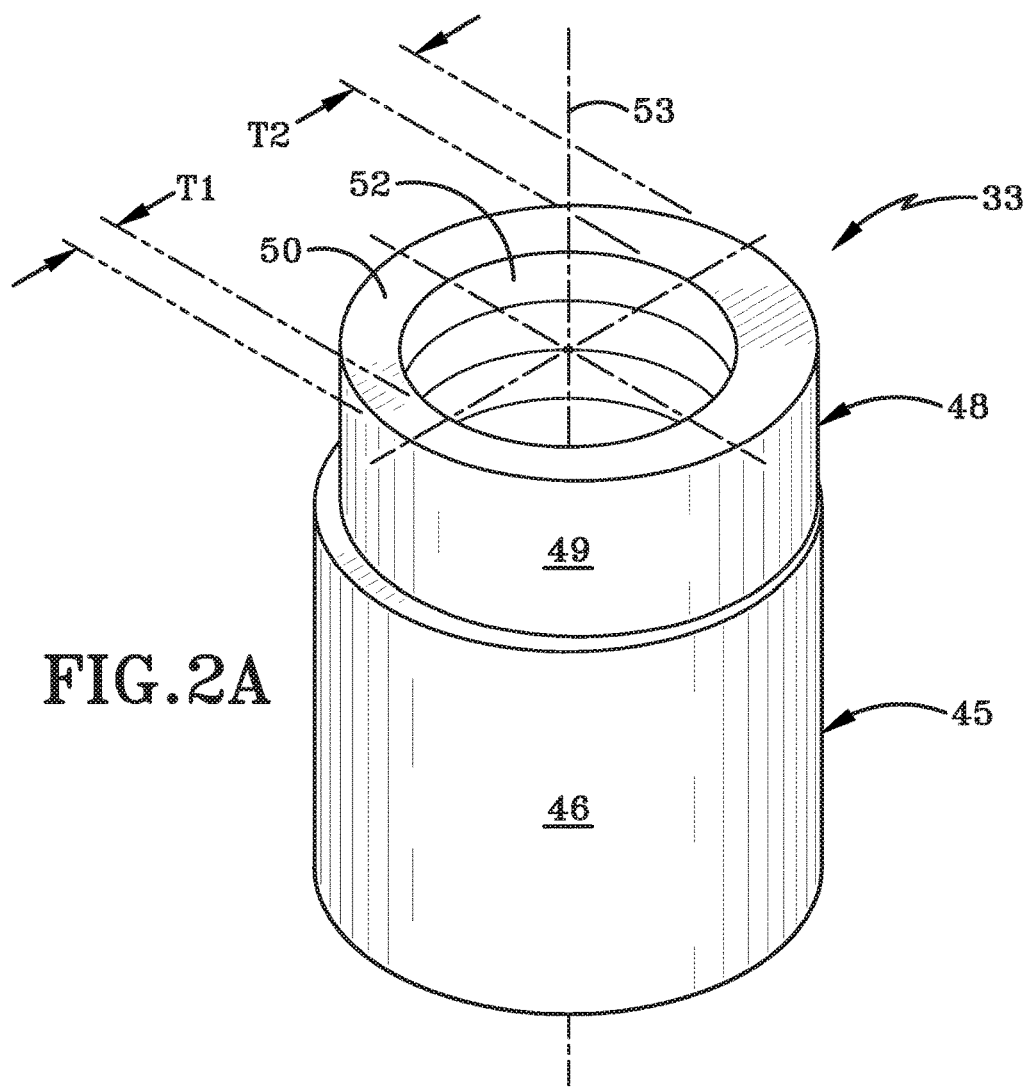
FIG. 2A is an enlarged perspective view of the cam of the adjustment mechanism.
Figure 2B:
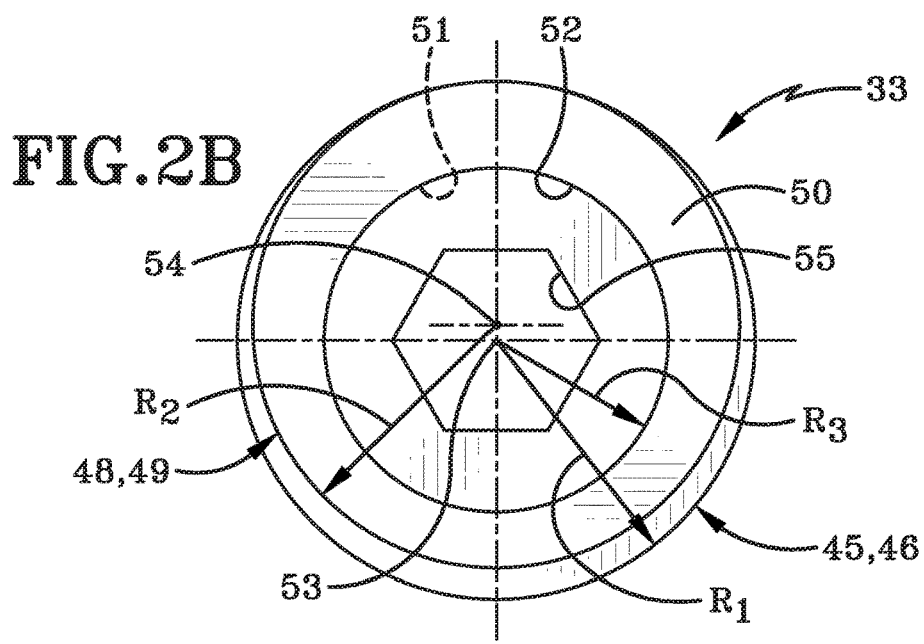
FIG. 2B is a top plan view of the cam as shown in FIG. 2A.

Radius $R_1$ extends from a longitudinal axis 53 and radius $R_2$ extends from a center point or longitudinal axis 54 offset from axis 53 as shown in FIG. 2B. Cylindrical base portion 45 and offset camming portion 48 have concentric threaded bores 51 and 52, respectively, as shown in FIG. 9 which are defined by radius $R_3$ extending from a center point or axis 53. A tool-receiving aperture 55 is formed in the end of cam 33, which is opposite camming portion 48, for receiving an adjustment tool 56 such as the head 56A of an alien wrench. A fastener 35 is seated in and extends through a counterbore hole 36 formed in handle block 4 and through an oval-shaped hole 59 formed in blade 8 (FIG. 2 and FIG. 9) into threaded engagement with threaded bores 51 and 52 of cam 33 to secure cam 33 in hole 47 which has a smooth through bore enabling cam 33 to rotate therein (FIG. 9). Hole 36 is referred to as the adjustment hole to better distinguish it from the various other holes formed in the handle blocks and blades. Hole 59 can have other non-round shapes than oval and still achieve the desired pivotal or angular movement of blade 8 with respect to blade 7 as described further below.

The offset relationship of camming portion 48 with respect to base portion 45 and the offset center axis 53 for determining the outer cylindrical surface 49 of camming portion 48, forms an annular ring-like top surface 50 of a varying width as indicated by thicknesses T1 and T2 in FIG. 2A.

Cylindrical base portion 45 is seated in the smooth bore of hole 47 (FIG. 9) formed in the inner end of handle block 5 with camming potion 48 extending into oval-shaped hole or aperture 59 formed in the inner end of blade 8 and aligns with adjustment hole 36 formed in the inner end of handle block 4.

Figure 5:
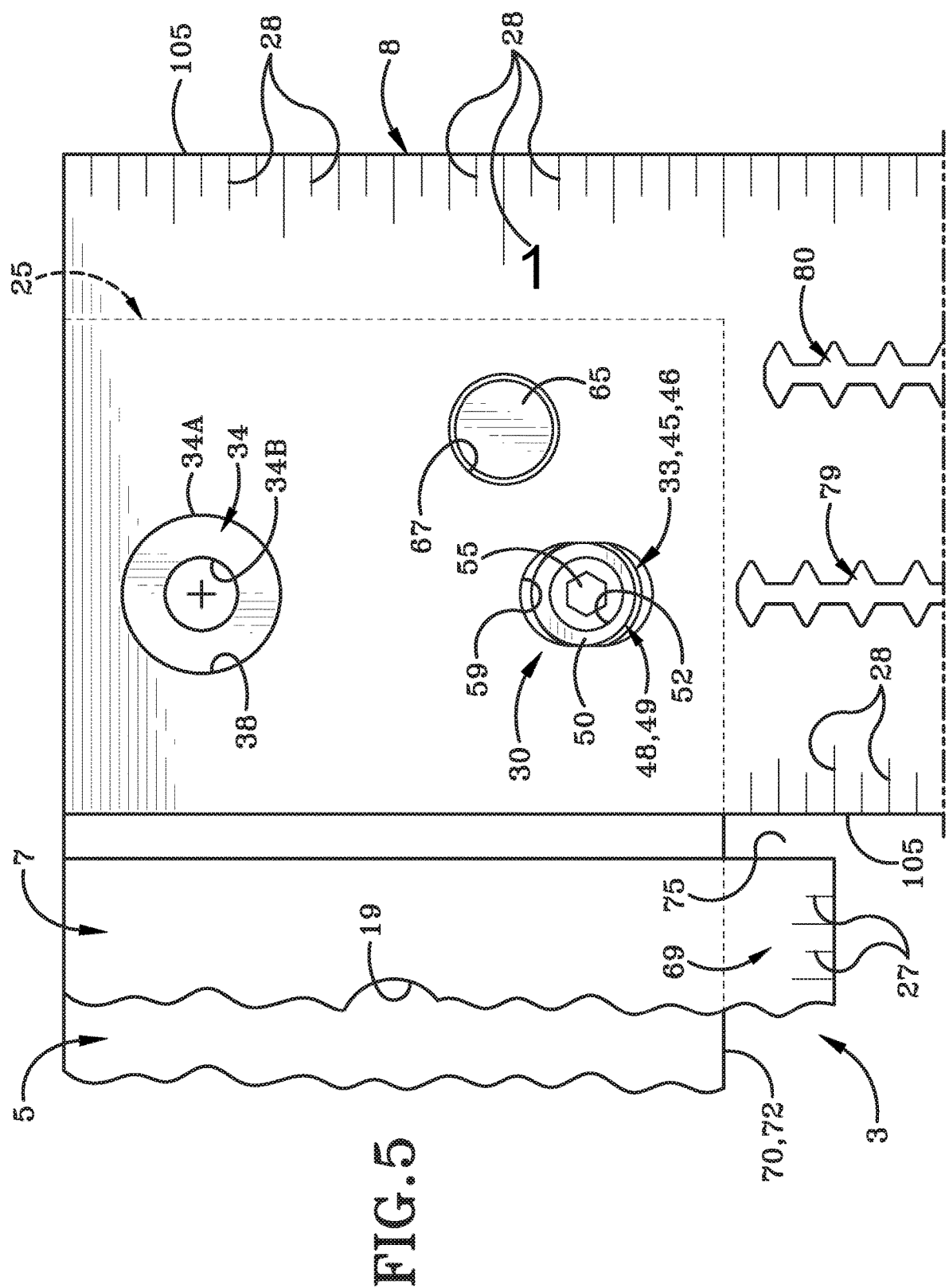
FIG. 5 is an enlarged fragmentary top plan view of the carpenters square as shown in FIG. 3 with the top block of the handle removed showing the cam and pivot boss of the adjustment mechanism.

An annular stud 65 is formed on block 5 adjacent the inner end thereof and projects through a slightly enlarged stud hole 67 formed in blade 8 to assist in positioning blade 8 in handle 3 (FIGS. 2 and 8). Stud hole 67 is slightly larger than the outer diameter of stud 65, as shown in FIGS. 5 and 8, to permit lateral movement between blade 8 and stud 65 when blade 8 is pivotally moved about a pivot boss 34 when adjusting blade 8 with respect to blade 7. As shown in FIGS. 13 and 14, pivot boss 34 (FIGS. 2 and 7) projects outwardly from block 5 toward block 4 and has an annular outer surface 34A and a threaded bore 34B which extends partially into block 5. A threaded fastener 42 extends through a counterbore hole 39 and through an aligned hole 38 formed in the inner end of blade 8 and into threaded engagement with boss 34 to pivotally mount blade 8 on handle 3. The outer annular surface 34A of boss 34 is complementary to the diameter of hole 38 and forms the pivot for blade 8.

In summary, three openings are formed in the inner end of blade 8 and are spaced longitudinally along the blade. Hole 38 is a round hole for receiving annular boss 34 forming the pivot member for blade 8. Hole 67 is a round hole for receiving annular stud 65, and the third opening is oval-shaped aperture 69 for receiving cam 33.

Figure 3:
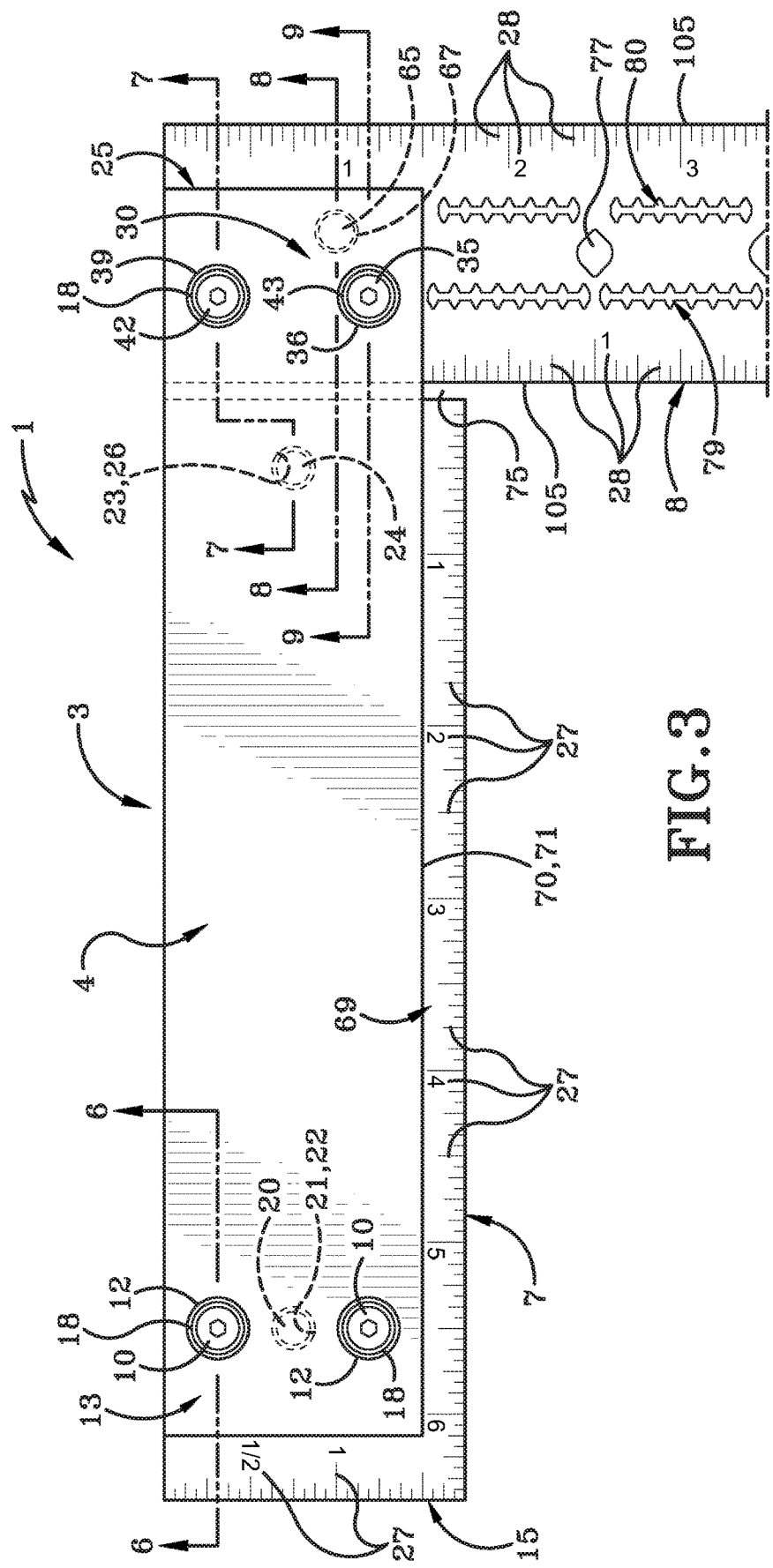
FIG. 3 is an enlarged fragmentary top plan view of the carpenters square of FIG. 1.
Figure 4:
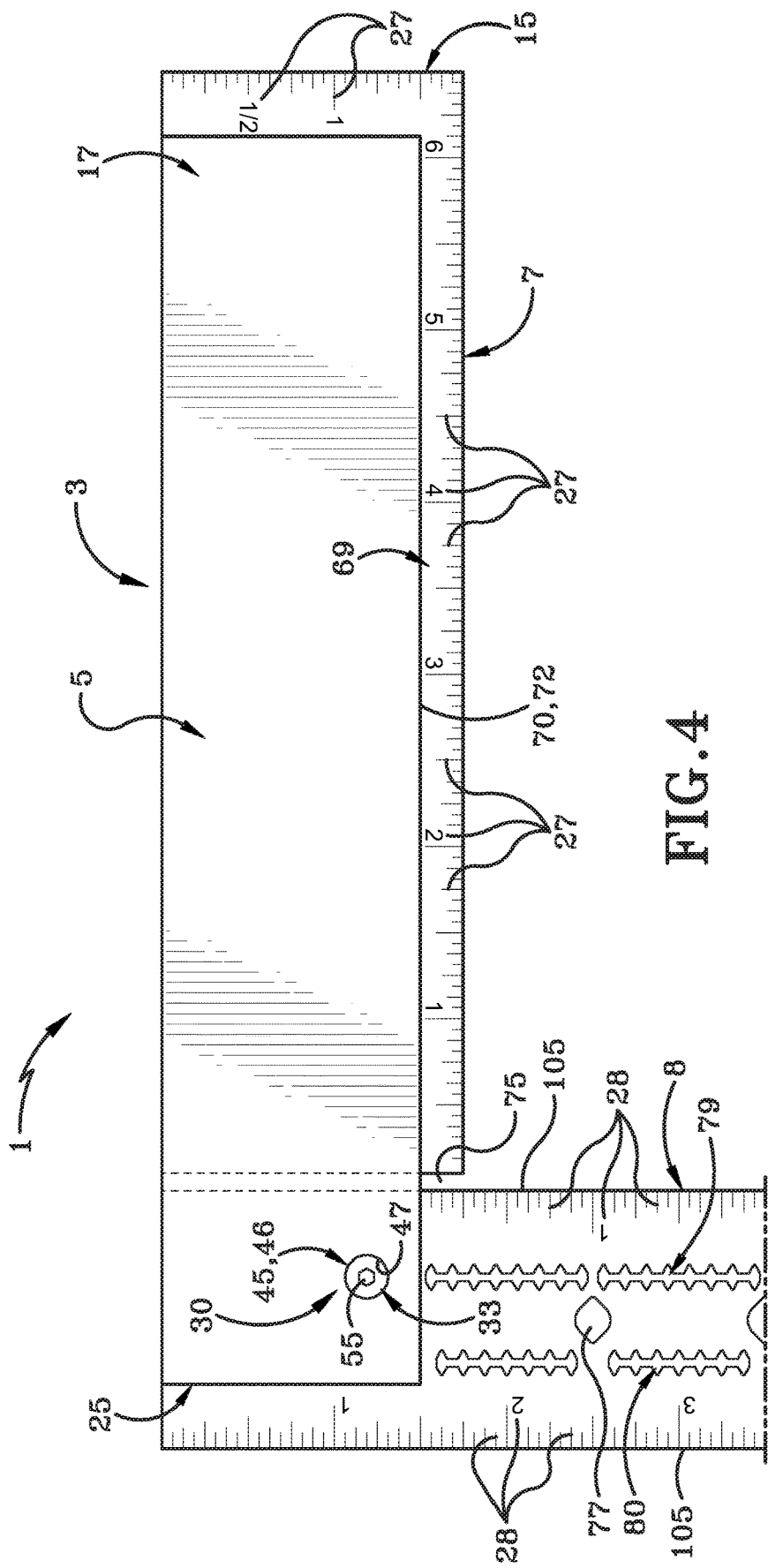
FIG. 4 is a bottom plan view of the carpenters square as shown in FIG. 3.

When blade 7 is mounted within handle 3, a longitudinal portion 69 thereof as shown in FIGS. 1 and 3, extends beyond the elongated edges 70 of blocks 4 and 5 and forms upper and lower shoulders 71 and 72 between blade edge portion 69 and blocks 4 and 5. These shoulders engage a workpiece when utilizing carpenters square 1 in laying out a right angle edge. The outer end 15 of blade 7 will also extend beyond the outer end of handle 3 (FIGS. 1 and 3) enabling the measuring indicia 27 to be visible along handle 3 and beyond the outer end thereof. When blades 7 and 8 are mounted on handle 3, a gap 75 will exist therebetween as shown in FIGS. 3 and 4, which enables the slight pivotal movement of blade 8 without any interference from blade 7 when adjusting blade 8 with respect to blade 7 to ensure the accurate 90° relationship therebetween.

A plurality of diamond-shaped apertures 77 are formed in second blade 8 and are spaced longitudinally along the blade and are located between first and second series 79 and 80 of smaller diamond-shaped cutouts which also extend longitudinally along the second blade on opposite sides of apertures 77. These apertures and series of cutouts provide points along blade 8 for receiving the point of a marking pen or pencil for accurately marking measured points on a structure along which blade 8 extends for use in the layout work with which carpenters square 1 is being used. These assist in the layout work and captures the pencil point at an exact location or locations.

Figure 10:
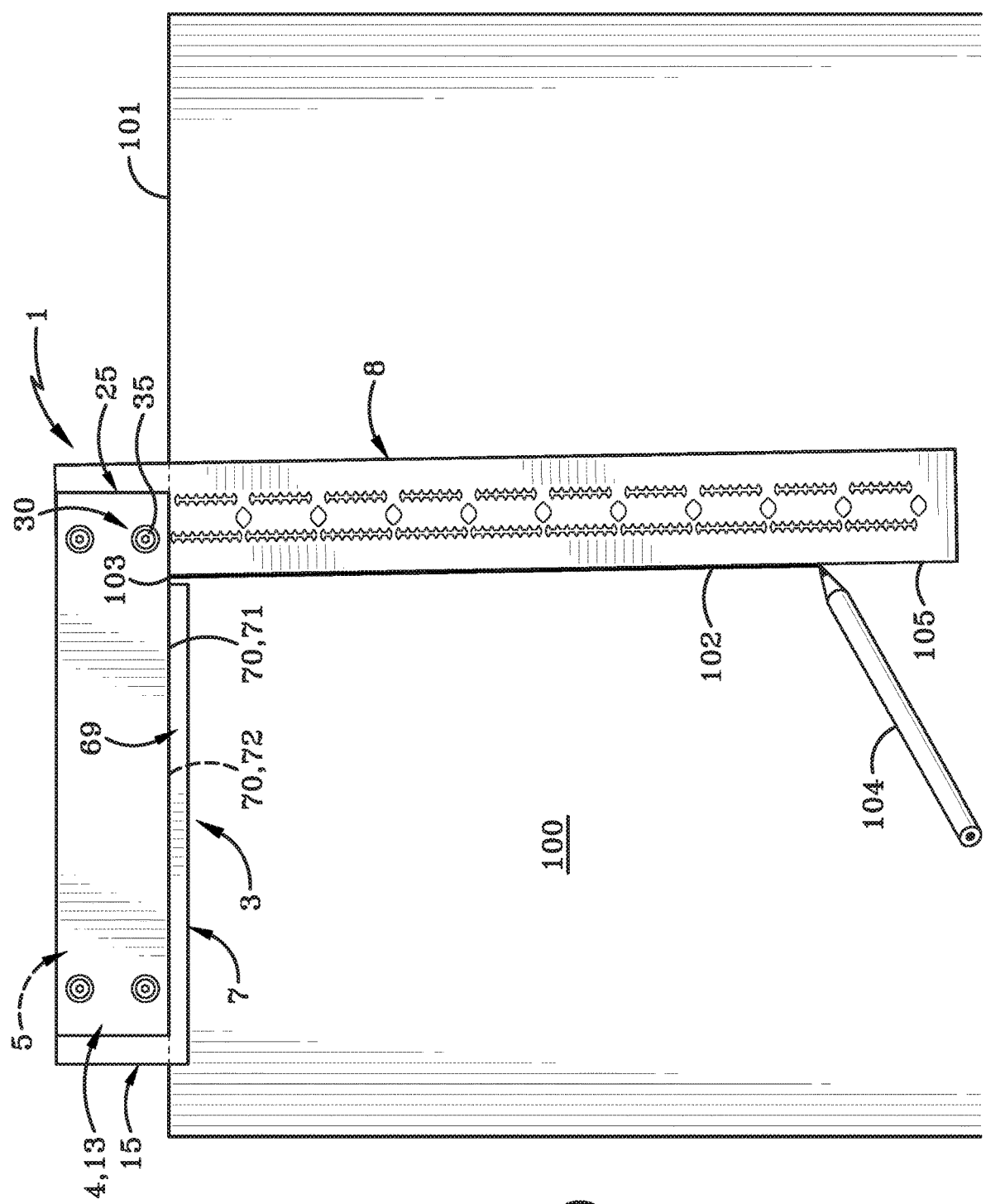
FIG. 10 is a top plan view showing the first step of using the carpenters square for verifying if the blades of the square are out of adjustment.
Figure 11:
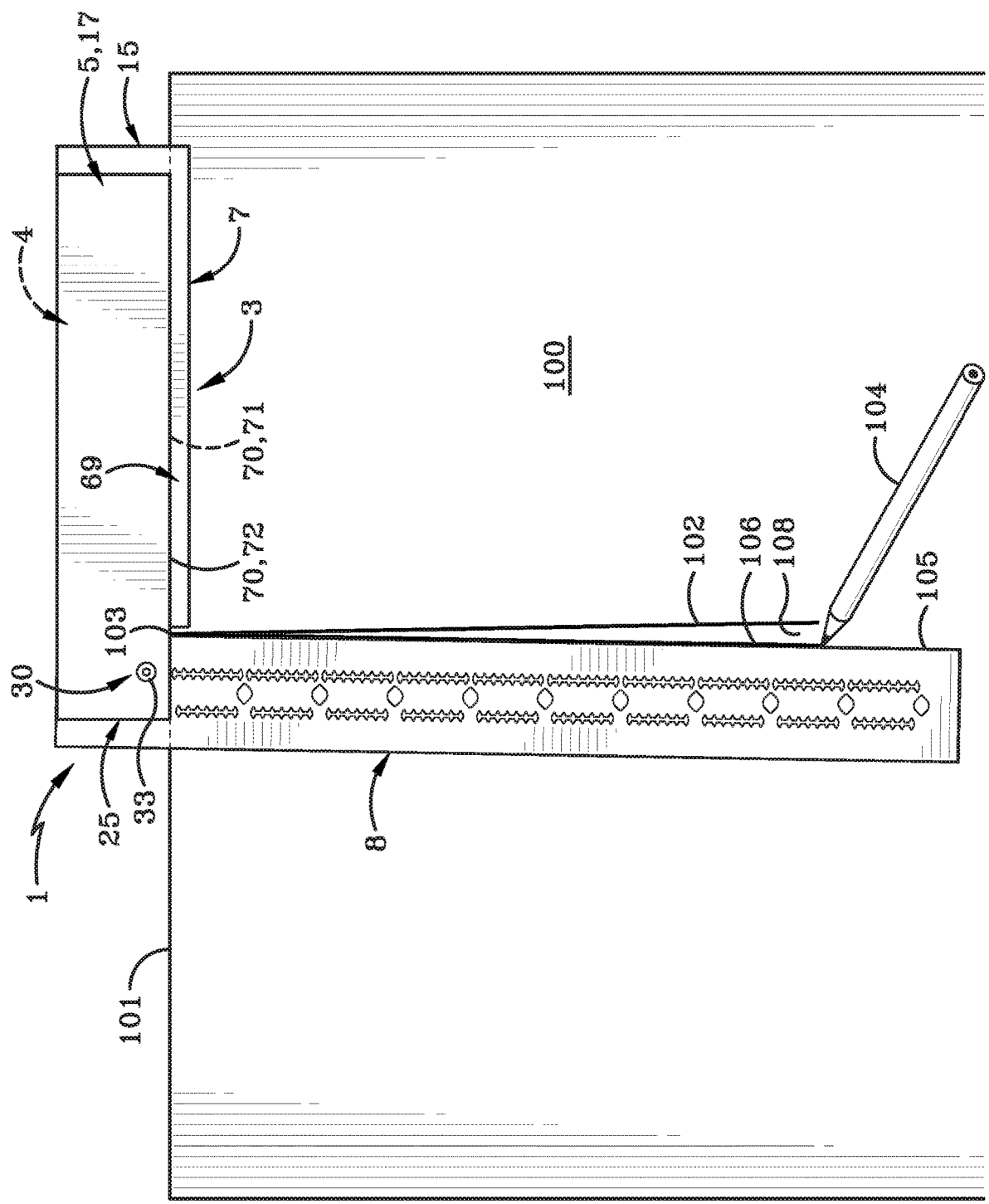
FIG. 11 is a top plan view similar to FIG. 10 with the carpenters square being flipped from the view of FIG. 10 showing the method of verifying if the square blades are out of adjustment.
Figure 12:
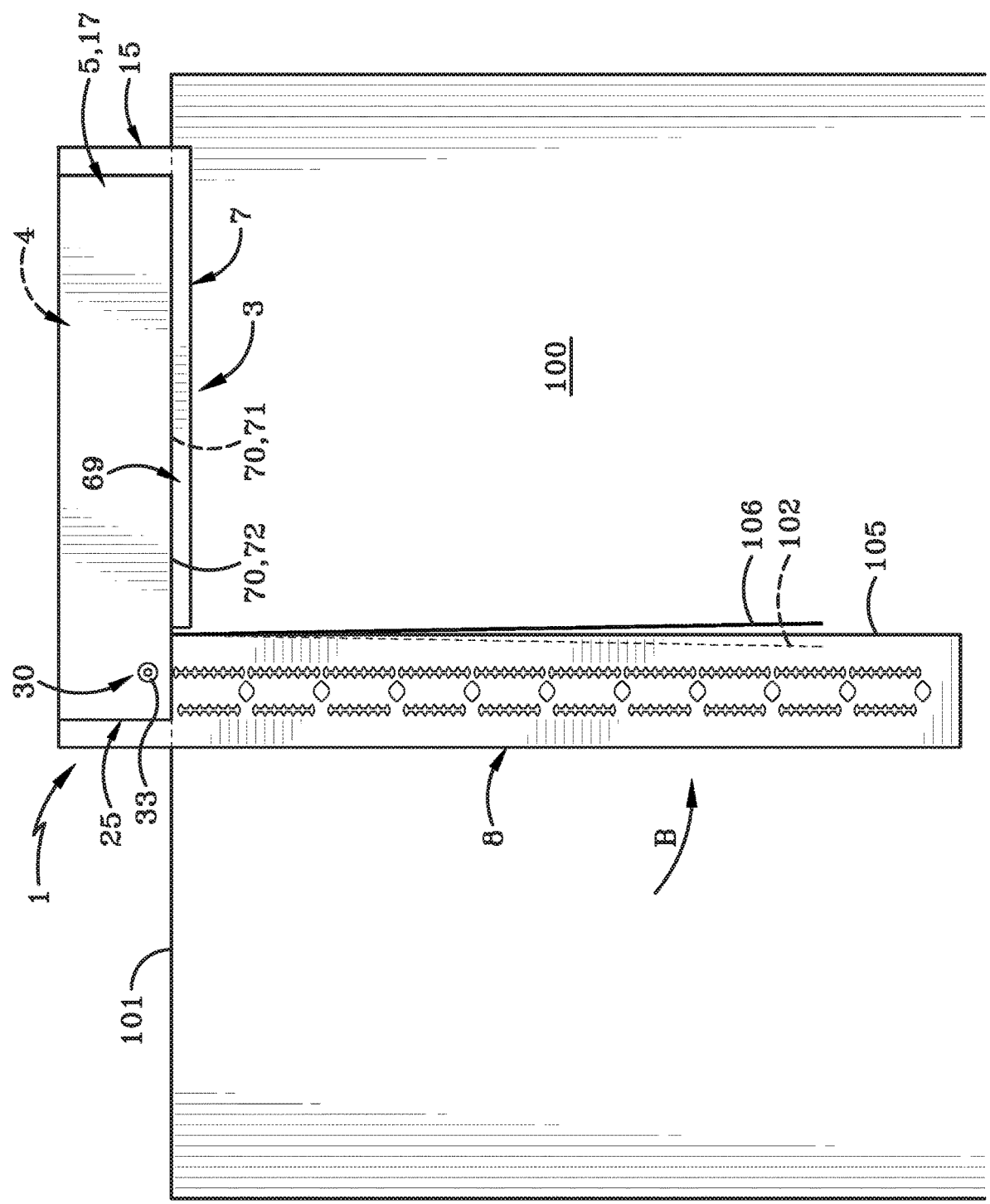
FIG. 12 is a top plan view similar to FIG. 11 showing a further step of adjusting the perpendicular relationship between the blades of the carpenters square.

The method of adjusting carpenters square 1 to ensure extreme accuracy of 90° between blades 7 and 8 is shown particularly in FIGS. 10-12. When a carpenter or other craftsman using square 1 is unsure as to the perpendicularity between blades 7 and 8, they can easily check this relationship and adjust blade 8 as described below. The craftsman will place handle 3 at an edge 101 of a reference board 100 as shown in FIG. 10, and will draw a long line 102 with a pencil 104 or other marking device from a starting point 103 at board edge 101 along blade edge 105. Next, the user will flip carpenters square 1 and reposition blade edge 105 along edge 101 as shown in FIG. 11 and with pencil 104, draws a second line 106 along blade edge 105 on the surface of reference board 100 from starting point 103. The user will then compare to see if first line 102 lies along the second line 106 and if it does, then he or she will know the perpendicular relationship between blades 7 and 8 is accurate at 90°. However, if a gap 108 exists between lines 102 and 106, the user will know that the two blades are not at a true perpendicular relationship and requires an adjustment to achieve the same.

To achieve this true 90° relationship, the user will then insert tool end 56A into aperture 55 as shown in FIG. 9, and will rotate cam 33 within hole 47. This will cause outer cylindrical surface 49 of camming portion 48 to slightly pivot blade 8 with respect to blade 7 by surface 49 engaging the inner edge of oval-shaped hole 59 as shown in FIGS. 5 and 9 due to the offset relationship of camming portion 49 with respect to base portion 45. This rotation slightly moves blade 8 angularly with respect to blade 7 until blade edge 105 divides pencil lines 102 and 106 into two equal parts as shown in FIG. 12 which then places blades 7 and 8 at a true 90° relationship with respect to each other. Next, blade 8 is tightened on handle 3 by tightening fastener 42 (FIGS. 3 and 7) which had been loosened to permit this adjustment, clamping blade 8 tightly between handle blocks 4 and 5. By repeating the previously described steps above, it will verify that the two newly drawn lines will align indicating the true alignment of blades 7 and 8. If again, the two lines show a gap therebetween, fastener 42 can be loosened and then blade 8 readjusted by the use of tool 56 engaged with cam 33.

FIGS. 2A and 2B illustrate the unique construction of cam 33 which when rotated even a very slight amount within oval-shaped hole 59 in blade 8 will pivot blade 8 a sufficient amount to adjust for a true 90° relationship with blade 7. The forming of hole 67 slightly greater than the diameter of annular stud 65 as shown in FIG. 8, enables blade 8 to slightly move about the pivot axis passing through the center of boss 34.

As an example as to the function of cam 33, refer to FIGS. 13 and 14. In FIG. 13, the thinner portion of the cam, such as represented by thickness $T_1$ in FIG. 2A, is engaged with the right hand edge of oval-shaped hole 59 and stud 65 is almost engaged with the right hand edge of hole 67. During an adjustment operation as shown in FIG. 14, rotation of cam 33 in a clockwise direction (Arrow A) a thicker portion of cam 33, as presented by thickness $T_2$ in FIG. 2A, will push against the right hand edge of hole 59 causing blade 8 to rotate in a counterclockwise direction (Arrow B) about boss 34 changing the angle α between blades 7 and 8 to achieve the desired 90°.

It is understood that this adjustment feature provides a very slight amount of adjustment, several degrees at the most, but will provide the adjustment and precise accuracy achieved by carpenters square 1. Such accurate adjustment of a degree or less is not required for many types of building construction, but for certain applications, such a high degree of accuracy and perpendicularity between blades 7 and 8 is desired and necessary, and thus can be achieved by carpenters square 1 of the subject disclosure.

The measurement indicia 27 and 28, together with the diamond-shaped apertures 77 and series of cutouts 79 and 80, enables the desired measurements and layout to be achieved to even greater accuracy than that possible with other types of carpenters squares not having such accuracy to ensure true perpendicularity between the two blades as that which is achieved by carpenters square 1.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

If used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, any method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An adjustable carpenters square comprising:
a handle having inner and outer ends;
a first blade having inner and outer ends mounted on and extending longitudinally along the handle;
a second blade having inner and outer ends mounted on the inner end of the handle and extending from the handle in a substantially perpendicular relationship with respect to the first blade; and
an adjustment mechanism operationally engaged with the inner end of the second blade for adjusting the perpendicular relationship between the first and second blades, said adjustment mechanism including a pivot member and a cam mounted in a spaced relationship from the pivot member at the inner end of the handle.

2. The adjustable carpenters square defined in claim 1 wherein the handle includes first and second blocks with the first blade being sandwiched between said blocks; and in which a pair of fasteners extend between the first and second blocks and through aligned openings in the first blade adjacent the outer end of the handle to secure the blocks together and the first blade sandwiched therebetween.

3. The adjustable carpenters square defined in claim 2 wherein a pair of longitudinally spaced dowels are seated in longitudinally spaced holes formed in the first and second blocks; and in which the dowels extend through holes formed in the first blade for positioning said first blade between said blocks.

4. The adjustable carpenters square defined in claim 1 wherein the handle includes first and second blocks with the first blade being sandwiched between said blocks; and in which the outer end of the first blade extends beyond the outer end of the handle; and in which a longitudinal edge portion of the first blade projects beyond a longitudinal edge of the handle.

5. The adjustable carpenters square defined in claim 1 wherein the handle includes first and second blocks; in which the pivot member is a boss formed on one of the blocks and projects toward the other of said blocks; and in which an outer annular surface of said boss is complementary to the diameter of a hole formed in the inner end of the second blade.

6. The adjustable carpenters square defined in claim 5 wherein the boss has a threaded bore; and in which a fastener extends through aligned holes formed in the other of said blocks and the inner end of the second blade to pivotally mount the second blade in the handle.

7. The adjustable carpenters square defined in claim 5 wherein an annular stud projects outwardly from one of the blocks adjacent the inner end of the handle and through an aligned hole formed in the second blade; and in which said hole is slightly larger than said stud to permit pivotal and lateral movement of said second blade about the boss.

8. The adjustable carpenters square as defined in claim 5 wherein an oval-shaped aperture is formed in the inner end of the second blade and aligns with a pair of holes formed in the first and second blocks; and in which the cam is seated in one of said holes in one of the blocks and extends into said aperture of said second blade.

9. The adjustable carpenters square as defined in claim 8 wherein a fastener is seated in the other of said holes in the first and second blocks and is engaged with the cam to secure said cam in said one of said holes.

10. The adjustable carpenters square as defined in claim 1 wherein three openings are formed in the inner end of the second blade; in which a first of said three openings is a round hole for receiving an annular boss formed on the handle forming the pivot member; in which a second of said three openings is a round hole for receiving an annular stud formed on the handle; and in which a third of said three openings is an oval-shaped aperture for receiving the cam.

11. The adjustable carpenters square defined in claim 1 wherein the cam of the adjustment mechanism is a one-piece member having a cylindrical base portion with an outer surface defined by a first radius $R_1$ and a camming portion having an outer cylindrical surface defined by a second radius $R_2$ smaller than said first radius $R_1$; and in which the outer surface of the camming portion is offset from the outer surface of the cylindrical base portion providing a camming surface engageable with the second blade.

12. The adjustable carpenters square defined in claim 11 wherein the cylindrical base portion and camming portion have concentric threaded bores for receiving a threaded fastener for securing the cam in a hole formed in the inner end of the handle.

13. The adjustable carpenters square defined in claim 12 wherein the cylindrical base portion has an aperture formed in an end thereof opposite the camming portion for receiving a tool to rotate the cam to pivot the second blade about the pivot.

14. The adjustable carpenters square defined in claim 11 wherein the camming portion has an inner bore concentric with a bore of the cylindrical base portion; and in which the outer surface of the camming portion is a cylindrical surface defined by a radius $R_1$ and has a center point offset from a center point of a radius $R_3$ defining the concentric bores of the cylindrical base portion and camming portion.

15. The adjustable carpenters square defined in claim 1 wherein a plurality of openings are formed in the second blade and are spaced longitudinally along the second blade.

16. The adjustable carpenters square defined in claim 15 wherein first and second series of diamond-shaped cutouts are formed in and extend longitudinally along the second blade with the plurality of apertures being located between said series of cutouts.

17. The adjustable carpenters square defined in claim 1 wherein the first and second blade are both elongated rectangular-shaped metal plates of equal thicknesses; and in which the second blade is longer than the first blade.

18. A method of adjusting a carpenters square comprising the steps of:

providing a carpenters square having a handle, a first blade secured to the handle and a second blade pivotally mounted on the handle and extending from the handle substantially perpendicularly to the first blade;

providing a cam extending from the handle and into an oval-shaped aperture formed in the second blade;

placing the handle and first blade along a straight edge of a reference board with the second blade extending substantially perpendicularly from said handle along the board;

drawing a first line on the board along a first edge of the second blade;

flipping the carpenters square and placing the handle along the said edge of the reference board;

locating the first edge of the second blade adjacent the first line on the reference board;

drawing a second line on the board along the first edge of the second blade;

rotating the cam thereby pivotally moving the second blade to an adjusted position wherein the first edge of the second blade divides any space between the first and second lines drawn on the reference board; and then securing the second blade in the adjusted position wherein the second blade will be perpendicular to the first blade.

19. The method of adjusting a carpenters square as defined in claim 18 including the step of:

inserting a tool into a bore formed in the cam for performing the step of rotating the cam.

\* \* \* \* \*